(12) United States Patent
Liu et al.

(10) Patent No.: US 7,656,114 B2
(45) Date of Patent: Feb. 2, 2010

(54) SERVO CONTROL APPARATUS FOR A LINEAR MOTOR

(75) Inventors: Chi-Tai Liu, Taichung (TW); Ching-Long Shih, Taichung (TW)

(73) Assignee: Hiwin Mikrosystem Corp., Taichung (TW)

( * ) Notice: Subject to any disclaimer, the term of this patent is extended or adjusted under 35 U.S.C. 154(b) by 175 days.

(21) Appl. No.: 11/866,997

(22) Filed: Oct. 3, 2007

(65) Prior Publication Data

US 2009/0091283 A1      Apr. 9, 2009

(51) Int. Cl.
    *G05D 23/275*      (2006.01)
(52) U.S. Cl. .................. 318/632; 318/560; 318/561; 318/135
(58) Field of Classification Search .............. 318/560, 318/561, 568.22, 632, 135
    See application file for complete search history.

(56) References Cited

U.S. PATENT DOCUMENTS

| | | | | |
|---|---|---|---|---|
| 4,262,239 A | * | 4/1981 | Kawa | 318/561 |
| 5,153,490 A | * | 10/1992 | Ueta et al. | 318/571 |
| 5,237,509 A | * | 8/1993 | Ueta et al. | 700/193 |
| 5,270,631 A | * | 12/1993 | Takahashi et al. | 318/135 |
| 5,374,883 A | * | 12/1994 | Morser | 318/605 |
| 5,739,659 A | * | 4/1998 | Ezuka | 318/605 |
| 5,770,933 A | * | 6/1998 | Larson et al. | 318/400.41 |
| 5,949,208 A | * | 9/1999 | Takahashi et al. | 318/560 |
| 6,246,228 B1 | * | 6/2001 | Alhorn et al. | 324/207.12 |
| 7,023,170 B2 | * | 4/2006 | Yasukawa et al. | 318/799 |
| 7,319,909 B2 | * | 1/2008 | Ishikawa | 700/28 |

\* cited by examiner

*Primary Examiner*—Bentsu Ro
*Assistant Examiner*—Thai Dinh
(74) *Attorney, Agent, or Firm*—Banger Shia

(57) ABSTRACT

A servo control apparatus for a linear motor comprises a position feedback device, a driver and a position compensating device that are connected with one another. The servo control apparatus is electrically connected to the linear motor. By such arrangements, it can not only improve the precision of the displacement of the linear motor, but also make the movement of the linear motor relatively smooth.

1 Claim, 3 Drawing Sheets

SERVO CONTROL APPARATUS FOR A LINEAR MOTOR

BACKGROUND OF THE INVENTION

1. Field of the Invention

The present invention relates to a linear motor, and more particularly to a servo control apparatus for a linear motor.

2. Description of the Prior Art

Generally, a conventional linear motor 10 (as shown in FIG. 1) comprises a servo control apparatus 20. The servo control apparatus 20 includes a position feedback device 30 and a driver 40. The position feedback device 30 is disposed at one side of the linear motor 10 and opposite the linear motor 10. The driver 40 is electrically connected to the linear motor 10 and the position feedback device 30, respectively. However, further analysis shows that this kind of linear motor 10 still has the following disadvantages:

The position feedback device 30 is manually assembled, so according to the influence of the operation habits and the applying force, the position feedback device 30 cannot be located opposite the linear motor 10 accurately. The location excursion of the position feedback device 30 will affect signal receiving operation, so the driver 40 is likely to receive error signals, thus affecting the displacement precision of the linear motor 10.

The present invention has arisen to mitigate and/or obviate the afore-described disadvantages.

SUMMARY OF THE INVENTION

The objective of the present invention is to provide a servo control apparatus for a linear motor which utilizes a position compensating device to improve the displacement precision of the linear motor and make the movement of the linear motor relatively smooth.

In order to achieve the above objective, the linear motor of the present invention comprises a servo control apparatus. The servo control apparatus comprises a position feedback device, a driver and a position compensating device. The position feedback device is disposed at one side of the linear motor and moves with respect to the linear motor. The position compensating device is connected to the position feedback device and the driver, respectively. The driver is connected to the linear motor. By such arrangements, the position feedback device of the servo control apparatus can utilize the position compensating device to correct signals to improve the displacement precision of the linear motor and make the linear move relatively smooth.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
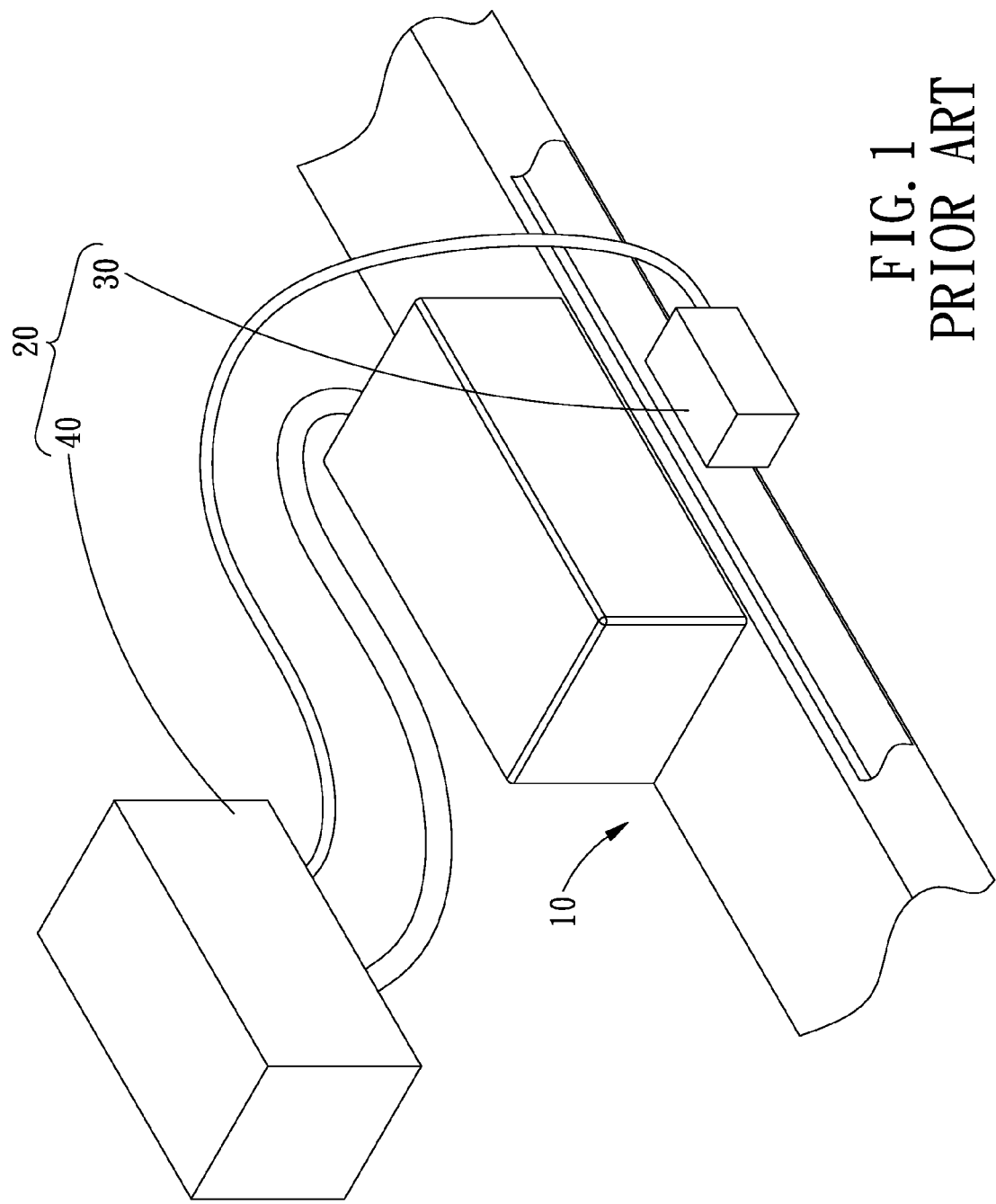
FIG. 1 is a perspective view of a conventional linear motor.
Figure 2:
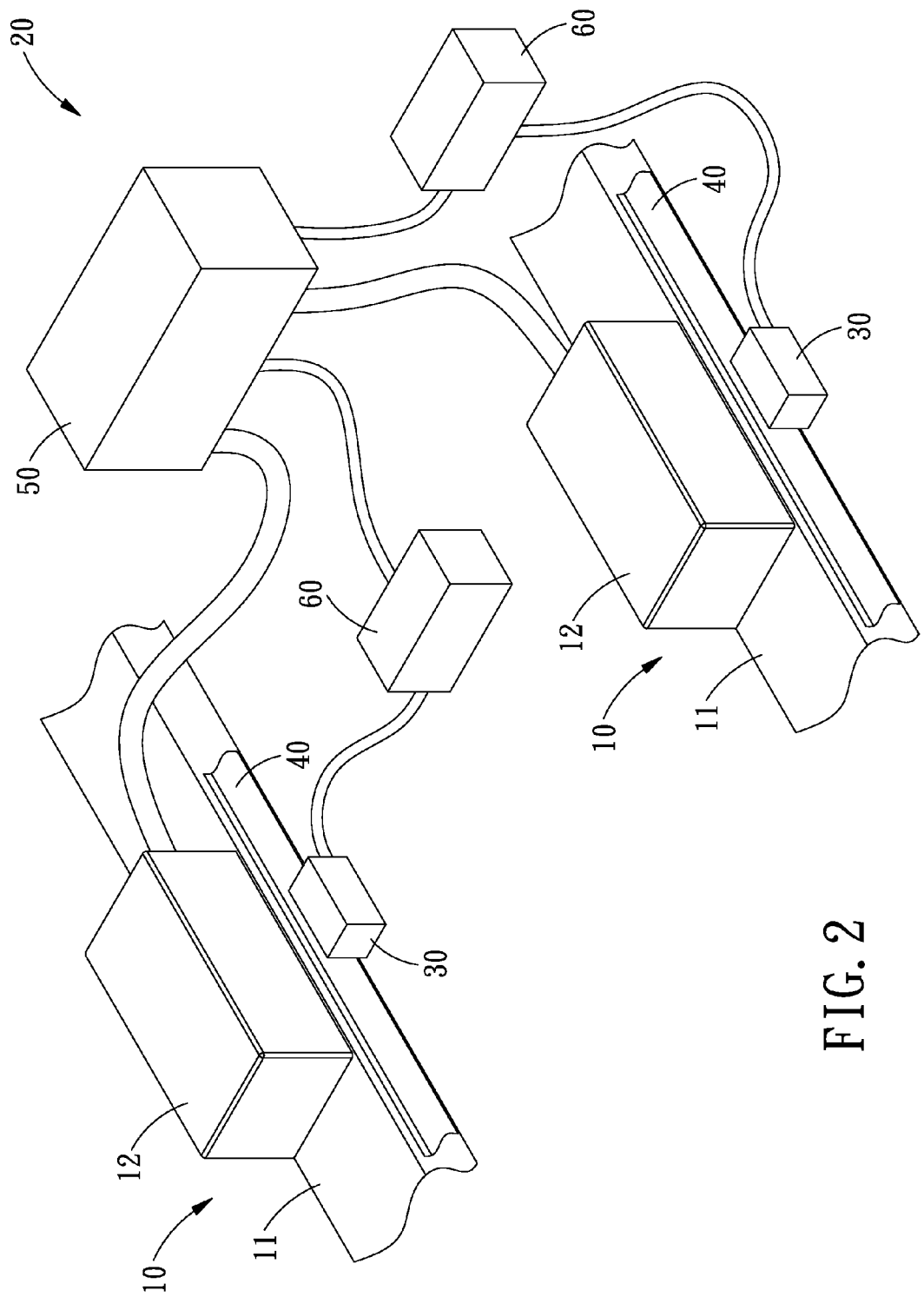
FIG. 2 is a perspective view of a servo control apparatus for a linear motor in accordance with the present invention.
Figure 3:
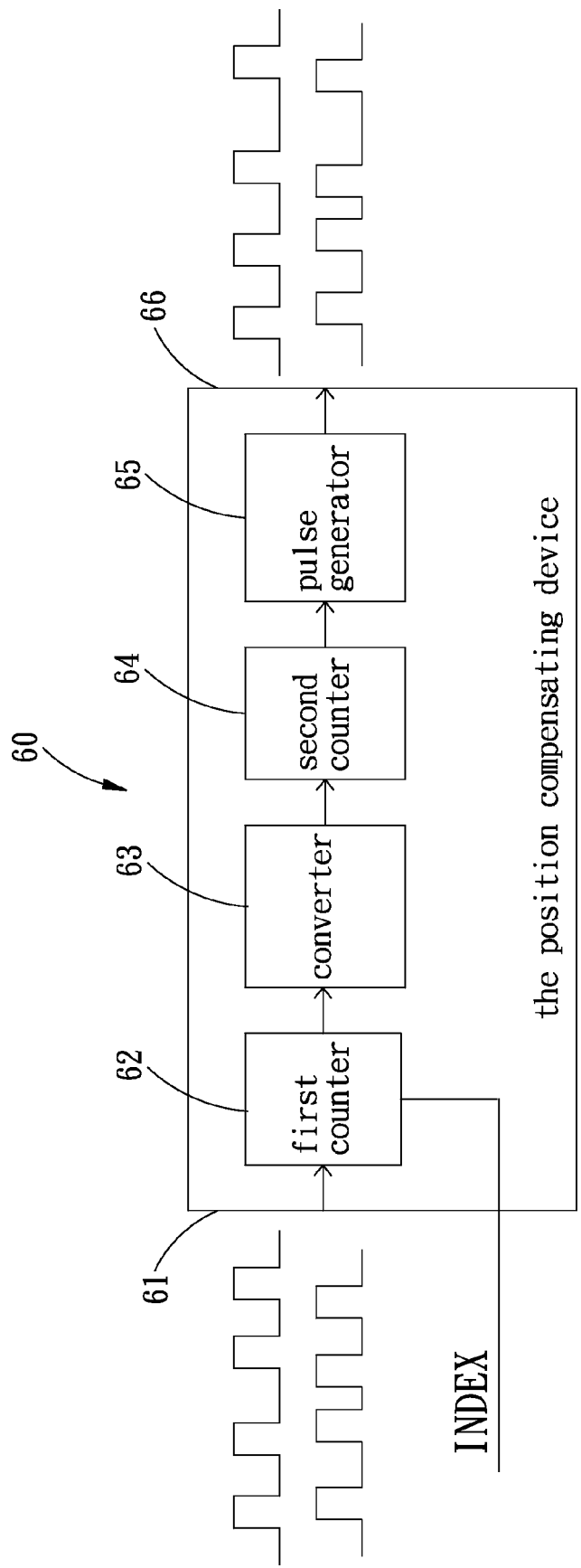
FIG. 3 is a system diagram of a position compensating device in accordance with the present invention.

Referring to FIGS. 2-3, a linear motor 10 in accordance with the present invention comprises a stator 11 and a mover 12. The mover 12 is slidably disposed on the stator 11 and driven to move along the stator 11 by power.

A servo control apparatus 20 for the linear motor 10 comprises a position feedback device 30, a driver 40 and a measuring member 50. One side of the measuring member 50 is assembled on one side of the stator 11 of the linear motor 10. The position feedback device 30 is located opposite the measuring member 50, and between the position feedback device 30 and the measuring member 50 is defined a measurement spacing. When the mover 12 of the linear motor 10 is moved on the stator 11, the position feedback device 30 of the servo control apparatus 20 will synchronously move to make the position feedback device 30 move with respect and along the measuring member 50 to obtain pulse by sensing. The driver 40 is connected to the mover 12 of the linear motor 10 and the position feedback device 30 of the servo control apparatus 20, respectively. The driver 40 receives the pulse sensed by the position feedback device 30 to control the movement of the mover 12 of the linear motor 10.

The servo control apparatus 20 of the linear motor 10 further comprises a position compensating device 60 which is connected to the line between the driver 40 and the position feedback device 30. The position compensating device 60 includes an input port 61, a first counter 62, a converter 63, a second counter 64, a pulse generator 65 and an output port 66. The input port 61 is electrically connected to the position feedback device 30. The first counter 62 is electrically connected to the input port 61. The converter 63 is electrically connected to the first counter 62. The second counter 64 is electrically connected to the converter 63. The pulse generator 65 is electrically connected to the second counter 64. The output port 66 is electrically connected to the pulse generator 65. The position compensating device 60 utilizes the input port 61 to receive the pulse obtained by the position feedback device 30. The first counter 62 is used to obtain the first count value from the pulse received by the position compensating device 60 first, and then the converter 63 will be used to convert the first count value into the converter value, and finally the second counter 64 will be used to obtain the second count value from the converter value. The abovementioned process is derived from the following formulas:

$$P = \text{the first count value}$$

$$m = \text{measurement spacing}$$

$$e_i = (e0, e1, e2 \ldots en)$$

$$i = \left(\frac{p}{m}\right)$$

$$\text{The second count value} = P + e_i + \frac{e_{i+1} - e_i}{m}(p - m \times i)$$

The second count value is obtained by the pulse generator 65 to generate the corresponding pulse which will be transmitted to the output port 66. And finally, the output port 66 will transmit the pulse to the driver 40.

Based on further analysis of the above explanation, it can achieve the following objectives:

The position feedback device 30 of the servo control apparatus 20 utilizes the position compensating device 60 to correct signals, so that the driver 40 will receive the corrected signals to accurately drive the linear motor 10 to move, thus not only reducing the offset error, but also making the movement relatively smooth, further increasing the service life of the linear motor 10.

To summarize, the present invention relates to a servo control apparatus for a linear motor. The servo control apparatus is electrically connected to the linear motor and includes a position feedback device, a driver and a position compensating device. By such arrangements, the present invention not only improves the displacement precision of the linear motor, but also makes the movement of the linear motor relatively smooth.

While we have shown and described various embodiments in accordance with the present invention, it is clear to those skilled in the art that further embodiments may be made without departing from the scope of the present invention.

What is claimed is:

1. A servo control apparatus for a linear motor comprising: at least one position feedback device and at least one driver, the position feedback device being located opposite the linear motor, the driver being electrically connected to the linear motor and the position feedback device, respectively, the servo control apparatus is characterized in that:

the servo control apparatus further comprises at least one position compensating device which is connected to a line between the driver and the position feedback device, the position feedback device of the servo control apparatus utilizes the position compensating device to perform signal correction;

the position compensating device includes an input port, a first counter, a converter, a second counter, a pulse generator and an output port, the input port is electrically connected to the position feedback device, the first counter is electrically connected to the input port, the converter is electrically connected to the first counter, the second counter is electrically connected to the converter, the pulse generator is electrically connected to the second counter, the output port is electrically connected to the pulse generator.

* * * * *